(12) United States Patent
Wu (10) Patent No.: US 12,060,100 B2
(45) Date of Patent: Aug. 13, 2024

(54) ARMREST FOLDING MECHANISM AND BABY CARRIAGE

(71) Applicant: WONDERLAND SWITZERLAND AG, Steinhausen (CH)

(72) Inventor: Haitao Wu, Dongguan (CN)

(73) Assignee: Wonderland Switzerland AG, Steinhausen (CH)

( * ) Notice: Subject to any disclaimer, the term of this patent is extended or adjusted under 35 U.S.C. 154(b) by 134 days.

(21) Appl. No.: 17/524,980

(22) Filed: Nov. 12, 2021

(65) Prior Publication Data
US 2022/0153330 A1 May 19, 2022

(30) Foreign Application Priority Data
Nov. 13, 2020 (CN) .......................... 202011269204.7

(51) Int. Cl.
*B62B 7/06* (2006.01)
(52) U.S. Cl.
CPC ...................................... *B62B 7/06* (2013.01)
(58) Field of Classification Search
CPC .... B62B 7/06; B62B 7/08; B62B 9/24; B62B 9/102; B62B 9/00; B62B 9/20
See application file for complete search history.

(56) References Cited

U.S. PATENT DOCUMENTS 5,992,188 A * 11/1999 Saunders .................. E05C 9/12
70/120
6,062,587 A * 5/2000 Cabagnero ................ B62B 7/08
280/47.38
6,860,504 B2 * 3/2005 Suga ......................... B62B 7/08
280/658
(Continued)

FOREIGN PATENT DOCUMENTS

| CN | 202557583 U | 11/2012 |
|---|---|---|
| CN | 103085850 A | 5/2013 |
| CN | 103832457 A | 6/2014 |

(Continued)

OTHER PUBLICATIONS

Search Report issued in corresponding Chinese Patent Application No. 202011269204.7 dated Oct. 26, 2020, consisting of 3 pp.

(Continued)

*Primary Examiner* — Steve Clemmons
(74) *Attorney, Agent, or Firm* — Volpe Koenig (57) ABSTRACT

An armrest folding mechanism is pivotally connected to an armrest and a first connecting rod of a connecting seat for folding the armrest with the retraction of the second connecting rod relative to the first connecting rod. The mechanism includes a locking member including a locking end, a connecting end, and a first rack part located between them. The locking end is releasably fitted to the armrest, and a first toothed structure is arranged on the first rack part. A pushing member includes a pushing end, a second rack part, and a second toothed structure being correspondingly arranged on the second rack part relative to the first toothed structure. An elastic element with a first end is connected to the connecting end, and a second end abuts the connecting seat. Additionally, a driving gear engages with the first and second toothed structures to cause folding of the armrest.

14 Claims, 9 Drawing Sheets

(56) References Cited

U.S. PATENT DOCUMENTS

| | | | | |
|---|---|---|---|---|
| 2009/0008909 | A1* | 1/2009 | Kassai | ............ B62B 7/08 280/658 |
| 2017/0101122 | A1 | 4/2017 | Zuo et al. | |

FOREIGN PATENT DOCUMENTS

| | | | | |
|---|---|---|---|---|
| CN | 204415486 | U | | 6/2015 |
| CN | 206856772 | U | | 1/2018 |
| CN | 206900455 | U | | 1/2018 |
| CN | 207875745 | U | | 9/2018 |
| CN | 108657348 | A | | 10/2018 |
| CN | 108791455 | A | | 11/2018 |
| CN | 208411842 | U | | 1/2019 |
| CN | 208530663 | U | | 2/2019 |
| CN | 109515509 | A * | 3/2019 | ............ B62B 3/02 |
| CN | 109677481 | A * | 4/2019 | ............ B62B 7/086 |
| CN | 208827912 | U | | 5/2019 |
| CN | 110155148 | A | | 8/2019 |
| CN | 110386182 | A * | 10/2019 | ............ A47D 1/00 |
| CN | 110667679 | A * | 1/2020 | ............ B62B 7/06 |
| CN | 110682958 | A | | 1/2020 |
| CN | 110920729 | B | | 7/2022 |
| DE | 19938562 | B4 | | 4/2007 |
| EP | 1647463 | A2 * | 4/2006 | ............ B62B 7/062 |
| GB | 2586842 | A * | 3/2021 | ............ A47D 1/00 |
| TW | M441603 | U | | 11/2012 |
| WO | 2014207689 | A2 | | 12/2014 |

OTHER PUBLICATIONS

Office Action issued in counterpart Taiwanese Patent Application No. 110140049 dated Apr. 12, 2023.

Office Action issued in corresponding Chinese Application No. 202011269204.7 dated Jan. 30, 2024. English Translation Included.

* cited by examiner

ARMREST FOLDING MECHANISM AND BABY CARRIAGE

CROSS REFERENCE TO RELATED APPLICATION

The present application is based on and claims the benefit of and priority to Chinese Patent Application No. 202011269204.7, filed on Nov. 13, 2020, the entire contents of which are incorporated herein by reference.

TECHNICAL FIELD

The disclosure relates to an armrest folding mechanism and a baby carriage including the armrest folding mechanism.

BACKGROUND

A baby carriage can alleviate the fatigue caused by holding baby for a long time, and improve comfortability of people's life. In addition, in order to facilitate carrying when going out, baby carriages are foldable, that is, the main structures of the carriage frames may be folded, so as to reduce the volume and facilitate carrying.

In the related art, for example, a folding mechanism for a baby carriage is disclosed. A frame of the baby carriage includes front feet, rear feet and handle which are pivotally connected to each other. Front wheels are mounted at the front feet, and rear wheels are mounted at the rear feet, such that the frame in an unfolded state may stands and walks on the ground. The handle may be rotatably folded in respect to the rear feet during the folding process of the frame, and under the force applied to the handle by the user in a downward direction, the handle may be rotatably folded in respect to the rear feet. In the process of unfolding the frame, the handle is pulled in a direction of forward and upward direction, and the handle brings an armrest connecting seat to overcome the barrier of elastic protrusions arranged at the rear feet and cross the elastic protrusions, thereby realizing the unfolding of the frame.

However, although the baby carriage disclosed in the above related art can realize folding of the main frame through the folding mechanism, in the folded state of the baby carriage, the armrests held by baby is still locked and cannot be folded. Therefore, the volume of the baby carriage in the folded state cannot be effectively reduced.

For another example, the related art also discloses an armrest folding device for a baby carriage, in which an armrest connecting seat includes a connecting seat body and a linking member pivotally connected to lower joint and rotatable about a pivot shaft in respect to the lower joint, and a pin passes through the body of the armrest and is fixed to a shaft hole seat on the lower joint together with the linking member, such that the body of the armrest and the linking member may synchronously rotate with the pin as a shaft. The armrest connecting seat also includes a through guide groove and a guide pin. The through guide groove is formed on the linking member and is located above a pivot point of the pin. The guide pin has one end passes through the through guide groove and is fixed to the upper joint, and the other end has a diameter larger than the width of the through guide groove, so that the guide pin may move in the through guide groove. When the upper joint and the lower joint rotate in respect to each other, the guide pin fixed in the upper joint may move in the through guide groove, causing the linking member and the connecting seat body to synchronously rotate with the upper joint around the pin, and at the same time causing the armrest connecting seat to rotate at a predetermined angle in respect to the upper and lower joints. Therefore, the armrest connecting seat and the armrest assembled thereon may be linked to a desired position relative to the rotation of a push rod and a foot rod.

However, the aforementioned armrest folding mechanism of the baby carriage still has problems of complex in structure, difficulty in assembling, and laborious in folding operation.

SUMMARY

In view of above, a purpose of the present application is to provide an armrest folding mechanism and a baby carriage including the armrest folding mechanism, wherein the armrest may be folded with the retraction of the backrest support or the frame relative to the seat support, thereby greatly improving convenience in use.

According to one aspect of the present application, an armrest folding mechanism is provided, which is pivotally connected to an armrest and connected to a first connecting rod of a connecting seat for enabling the armrest to be folded with the retraction of the second connecting rod of the connecting seat relative to the first connecting rod. The armrest folding mechanism comprises: a locking member including a locking end and a connecting end as well as a first rack part between the locking end and the connecting end, the locking end is releasably fitted to the armrest, and a first toothed structure is arranged on the first rack part; a pushing member including a pushing end and a second rack part, a second toothed structure is arranged on the second rack part, the second toothed structure and the first toothed structure are arranged opposite to each other, and the pushing end moves under a pushing action of the second connecting rod; an elastic element including a first end and a second end opposite to each other, the first end is connected to the connecting end, and the second end abuts against the connecting seat; and a driving gear engaging with the first toothed structure and the second toothed structure.

Preferably, the first rack part is formed as a first frame, the first frame has an upper edge and a lower edge arranged parallel to each other, the first toothed structure is arranged on an inner side of at least one of the upper edge and the lower edge of the first frame; the second rack part is formed as a second frame, the second frame has an upper edge and a lower edge arranged parallel to each other, and the second toothed structure is arranged on an inner side of at least one of the upper edge and the lower edge of the second frame; and the driving gear is penetratingly arranged in the first frame and the second frame, to be engaged with the first toothed structure and the second toothed structure.

Preferably, the first toothed structure is arranged on the inner side of the upper edge of the first frame, the second toothed structure is arranged on the inner side of the lower edge of the second frame; or alternatively, the first toothed structure is arranged on the inner side of the lower edge of the first frame, the second toothed structure is arranged on the inner side of the upper edge of the second frame.

Preferably, the first frame and/or the second frame is rectangular.

Preferably, the second connecting rod of the connecting seat is provided with a driving member, and the driving member pushes the pushing end during a process the second connecting rod is folded in respect to the first connecting rod.

Preferably, the pushing end is provided with a guiding face for guiding a pushing of the driving member.

Preferably, the armrest is provided with a locking hole, and the locking end is releasably fitted to the locking hole.

Preferably, the locking end of the locking member has a non-circular cross-section, and the locking hole of the armrest has a cross-section shaped matching that of the locking end.

According to another aspect of the present application, a baby carriage is provided. The baby carriage comprises: a frame forming a main frame structure of the baby carriage; two connecting seats, each of the connecting seats includes a first connecting rod and a second connecting rod pivotally connected to each other, such that the second connecting rod is folded and unfold relative to the first connecting rod; a seat support, both ends of the seat support are respectively connected to the first connecting rod of each of the connecting seats; an armrest folding mechanism, connected to the first connecting rod; and an armrest, pivotally connected to the armrest folding mechanism, such that the armrest is retracted with the folding of the second connecting rod of each of the connecting seats relative to the first connecting rod.

Preferably, the second connecting rod is connected to the frame of the baby carriage, and more preferably, the second connecting rod is connected to the frame of the baby carriage through a crossbar.

Preferably, the baby carriage further comprises a backrest support pivotally connected the seat support, and the second connecting rod is connected to the backrest support.

In the armrest folding mechanism according to the disclosure and the baby carriage comprising the armrest folding mechanism, the armrest may be retracted with the folding of the backrest support or the frame relative to the seat support, thereby avoiding the cumbersome operations of separately folding the armrest which are necessary in the related art, greatly improving convenience in use. Furthermore, the armrest folding mechanism according to the disclosure has the advantages of simple in structure, easy in assembling, and labor-saving in folding operation.

BRIEF DESCRIPTION OF THE DRAWINGS

Those skilled in the art will understand, the drawings are mainly used for illustrative purposes and are not intended to limit the scope of the subject matter of the disclosure described herein. The drawings are not necessarily drawn to scale. In some cases, various aspects of the subject matter of the disclosure herein may be exaggerated or enlarged in the drawings to facilitate understanding of different features. In the drawings, the same reference numerals generally refer to the same features (e.g., functionally similar and/or structurally similar elements).

In the drawings.

DETAILED DESCRIPTION

The drawings and exemplary embodiments described below are not meant to limit the scope of these embodiments to a single embodiment. The embodiments can be realized by replacing part or all of the described or illustrated elements. In addition, in case that certain elements of the disclosed exemplary embodiment may be partially or wholly implemented using known components, in some cases, only the parts of such known components necessary for understanding this embodiment are described, and detailed descriptions of other parts of these known components are omitted so as not to obscure this embodiment.

The armrest folding mechanism according to the disclosure can be applied to a variety of devices, such as a car's child seat, a child dining chair, and the like. For the sake of brevity, the following embodiments only take the armrest folding mechanism applied to a baby carriage as an example for description.

Figure 1:
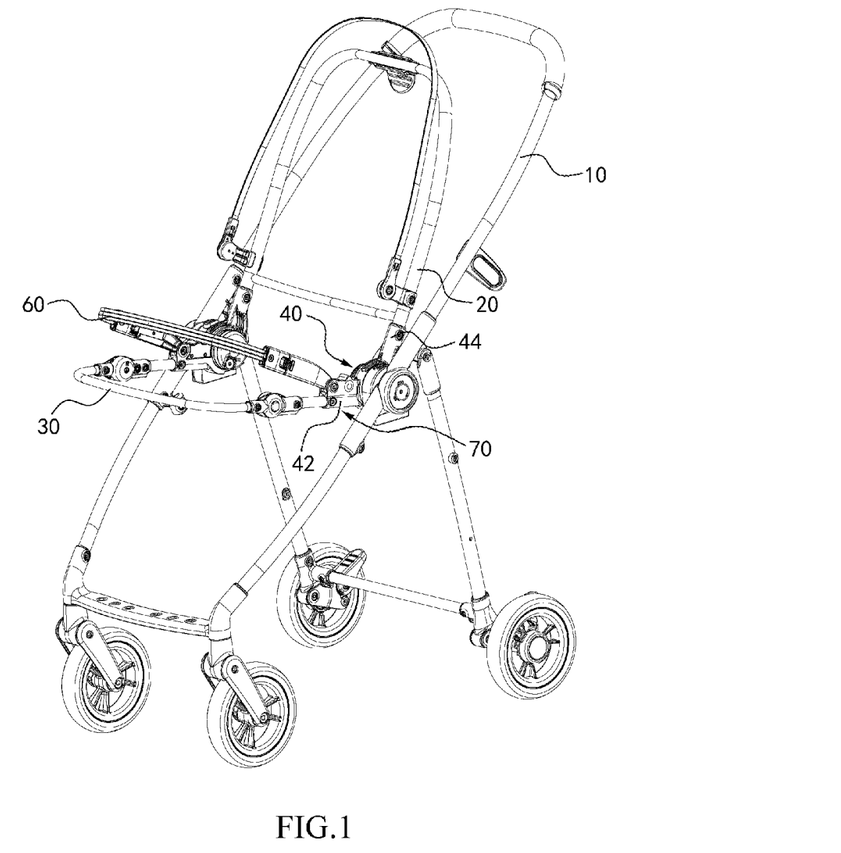
FIG. 1 is a schematic view of a baby carriage having an armrest folding mechanism according to the disclosure.

As shown in FIG. 1, which schematically shows a baby carriage according to the disclosure, and only shows a frame structure of the baby carriage for easy description, which mainly comprises a frame 10, a backrest support 20 and a seat support 30. The frame 10 constitutes a main structure of the baby carriage, and the backrest support 20 and the seat support 30 together form an accommodating space for a baby. In addition, in order to improve comfortability and safety of the baby in seating, an armrest 60 is also provided for the baby to grasp when seating in the baby carriage.

Figure 2:
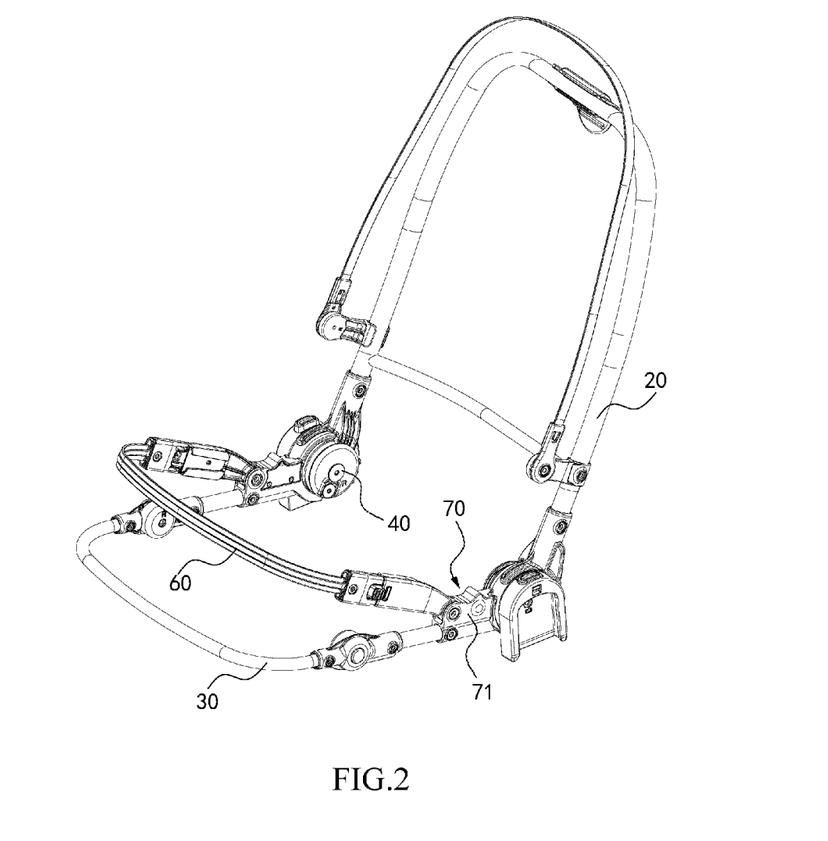
FIG. 2 is a schematic view of a baby carriage having an armrest folding mechanism according to the disclosure with its main frame structure in an unfolded state.
Figure 3:
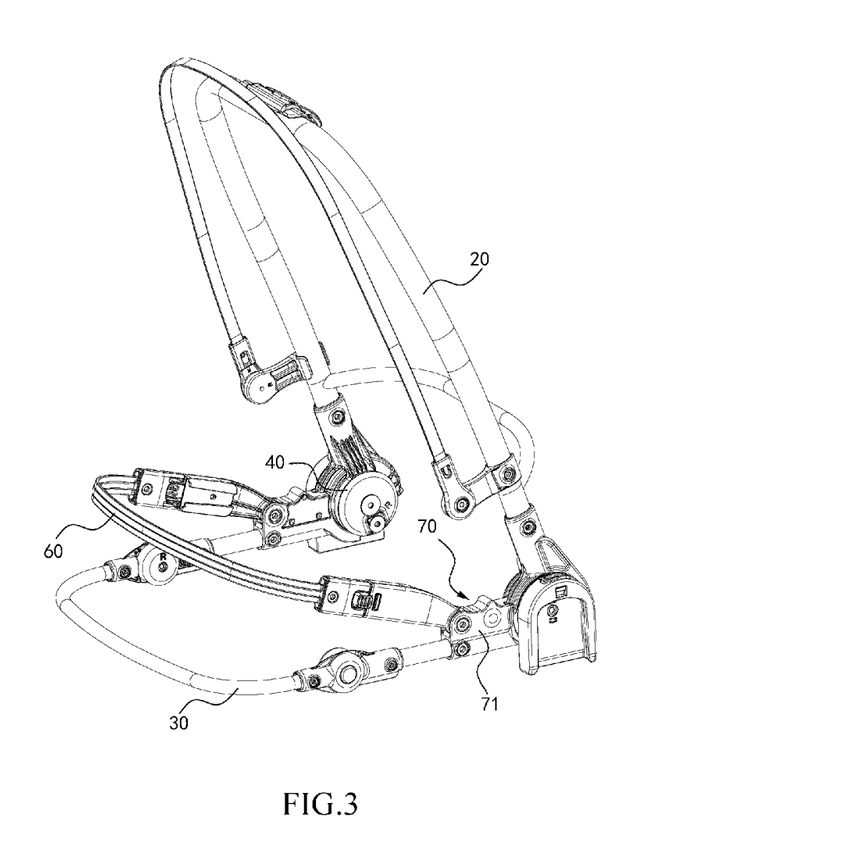
FIG. 3 is a schematic view of a baby carriage having an armrest folding mechanism according to the disclosure with its main frame structure in a half folded state.
Figure 4:
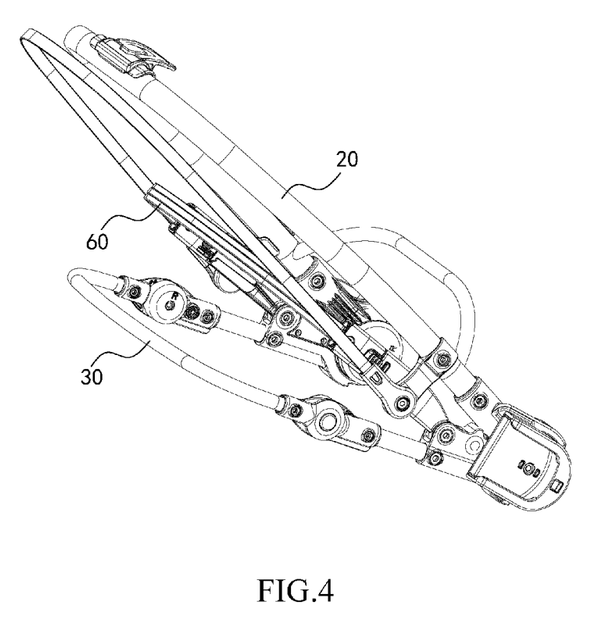
FIG. 4 is a schematic view of a baby carriage having an armrest folding mechanism according to the disclosure with its main frame structure in a folded state.

The baby carriage is usually arranged to be folded, so that the baby carriage may be retracted when it needs to be carried out, and then unfold for a baby to sit within. Specifically, as schematically shown in FIG. 2, the backrest support 20 and the seat support 30 are pivotally connected to each other by connecting seats 40 symmetrically arranged on both sides. More specifically, each of the connecting seats 40 includes a first connecting rod 42 and a second connecting rod 44 pivotally connected to each other, the first connecting rod 42 is connected to the seat support 30, and the second connecting rod 44 is connected to the backrest support 20. Preferably, the first connecting rod 42 is fixedly connected to the seat support 30, and the second connecting rod 44 is fixedly connected to the backrest support 20. The backrest support 20 may be in a folded or unfolded state relative to the seat support 30. In another embodiment, the seat support 30 is slidably connected to the first connecting rod 42, and the backrest support 20 is slidably connected to the second connecting rod 44. FIG. 2 shows a schematic view of the backrest support 20 in the unfolded state with respect to the seat support 30. In the unfolded state, an angle between the backrest support 20 and the seat support 30 is of approximately 90 degrees. The above-mentioned angle values are only examples, and the present application is not limited to the angles shown in this example. Please also refer to FIGS. 3 and 4, which respectively show schematic views of the main frame structure of the baby carriage according to the disclosure in half folded and folded states. The angle between the backrest support 20 and the seat support 30 may be continuously reduced as further folding. In the fully folded state shown in FIG. 4, the backrest support 20 is completely folded relative to the seat support 30, and the angle between them is close to 0 degree, thus greatly reducing the baby carriage's volume, and facilitating carrying outside.

The baby carriage according to the disclosure is further provided with an armrest folding mechanism 70. Moreover, both ends of the armrest 60 are respectively pivotally connected to the two armrest folding mechanisms 70, so that the armrest 60 may be unlocked and folded as the backrest support 20 folds relative to the seat support 30. Therefore, the armrest folding mechanism 70 produces automatic retraction, which greatly improves the convenience of the folding operation. Although providing two armrest folding mechanisms 70 is preferable in view of balance and stability, according to the disclosure, the armrest folding mechanism 70 may also be provided by one.

Figure 5:
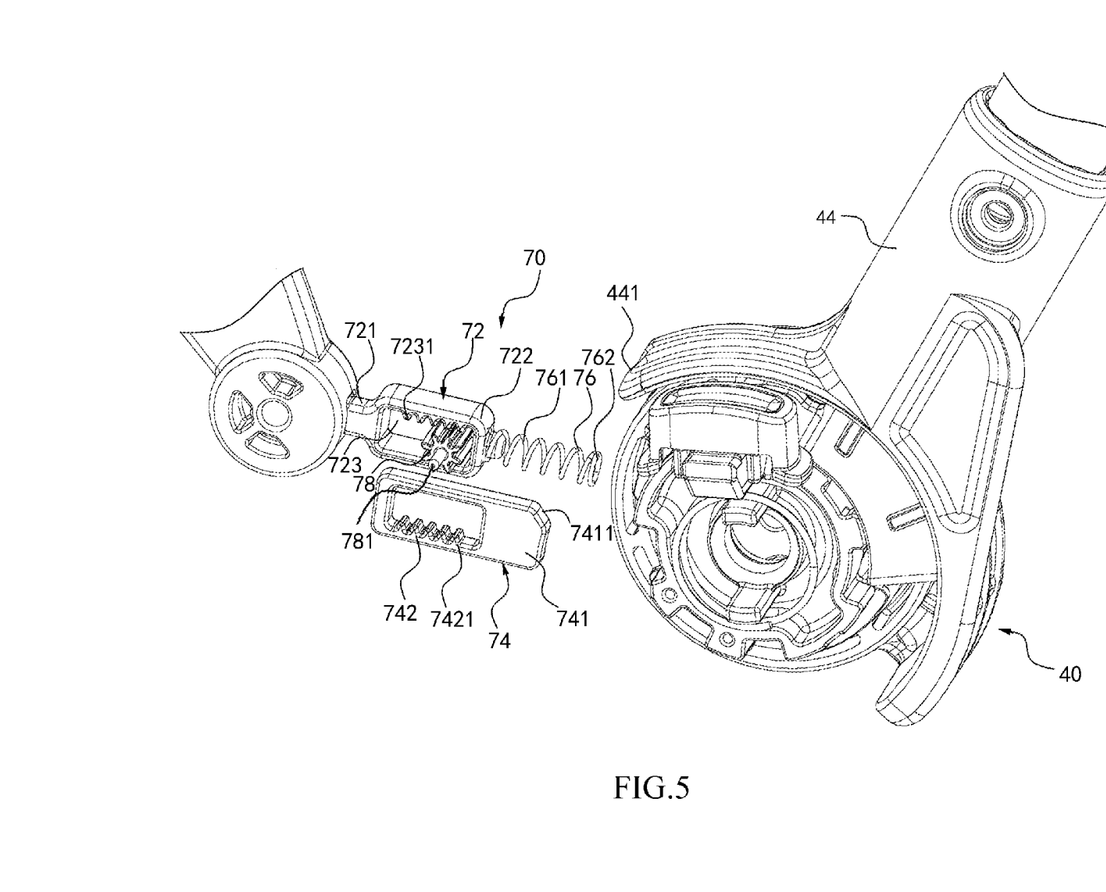
FIG. 5 is a schematic view showing an armrest folding mechanism according to the disclosure.
Figure 6:
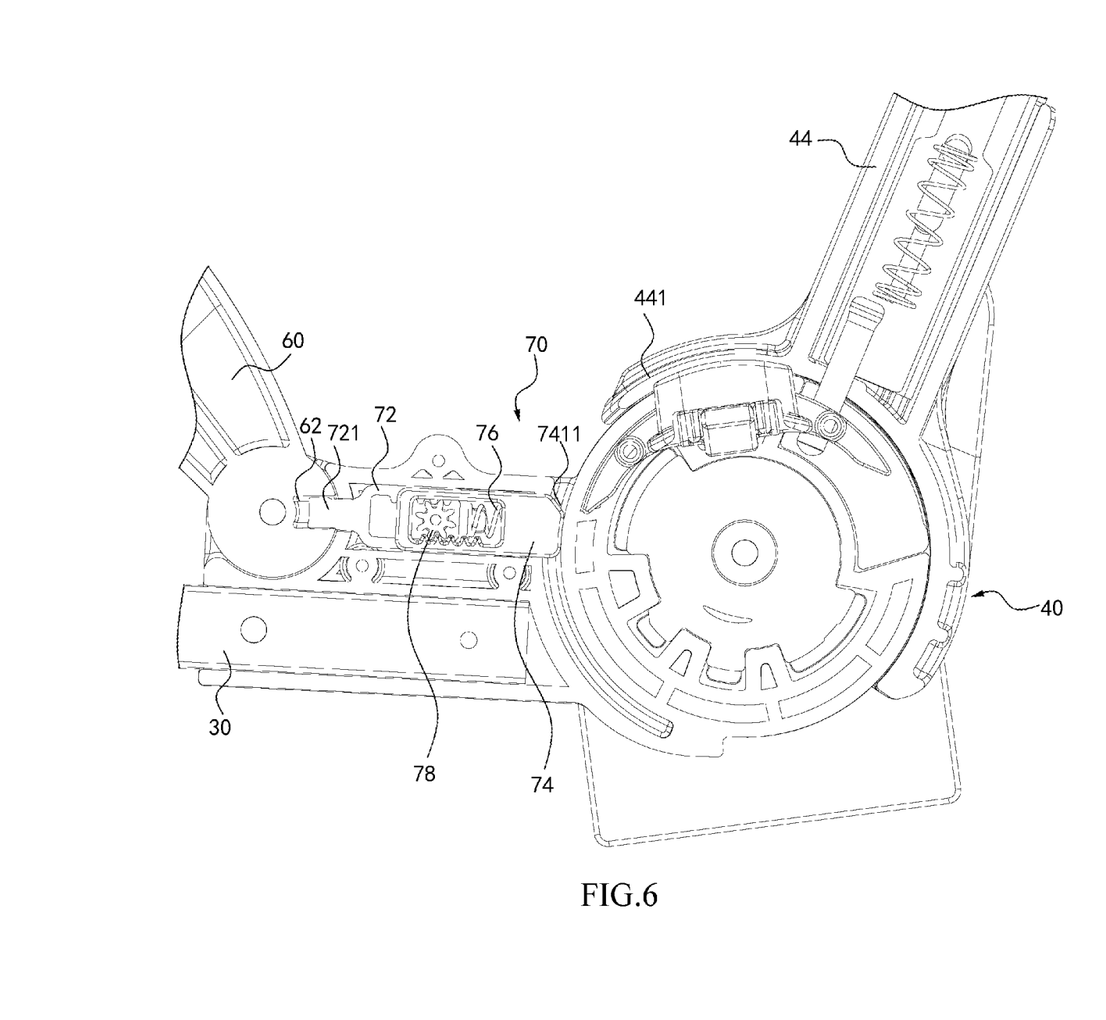
FIG. 6 is another schematic view showing an armrest folding mechanism according to the disclosure.

The specific structure of an armrest folding mechanism 70 according to the disclosure will be described in detail as below with reference to FIG. 5. Two armrest folding mechanisms 70 are symmetrically arranged at both ends of the armrest 60. The armrest folding mechanism 70 is connected to the first connecting rod 42 of one of the connecting seats 40. Hereinafter, only one armrest folding mechanism 70 arranged on one side is taken as an example for description. As shown in FIG. 5, the armrest folding mechanism 70 includes a locking member 72, a pushing member 74, an elastic element 76, and a driving gear 78. Further referring to FIG. 6 at the same time, the locking member 72 includes a locking end 721, a connecting end 722, and a first rack part 723 located between the locking end 721 and the connecting end 722. The first rack part 723 is provided with a first toothed structure 7231. The locking end 721 of the locking member 72 is releasably locked to the armrest 60, e.g., releasably locked in the locking hole 62 of the armrest 60 (as shown in FIG. 6). The connecting end 722 of the locking member 72 is connected to a first end 761 of the elastic element 76, and a second end 762 of the elastic element 76 abuts against the connecting seat 40. The first rack part 723 between the locking end 721 and the connecting end 722 may be in various forms, for example, may be in a shape of a rack. In the embodiment shown in the drawings, the first rack part 723 is in the form of a frame. Although a form of a rectangular frame is shown in this embodiment, other forms of other shapes may be suitably used. In addition, as shown in FIG. 6, the frame of the first rack part 723 has an upper edge and a lower edge which are arranged parallel to each other, and the first toothed structure 7231 is arranged on the upper edge of the frame. Of course, the first toothed structure 7231 may also be arranged on the upper edge and the lower edge of the frame at the same time. Or alternatively, the first toothed structure 7231 is only arranged on the lower edge of the frame.

In addition, a cross-section of the locking end 721 of the locking member 72 is non-circular, such as the rectangle shape shown in FIG. 6. Correspondingly, a cross-section of the locking hole 62 of the armrest 60 has a shape matching the cross-section of the locking end 721, such as the rectangle shape shown in FIG. 6. The matched non-circular cross-sections of the locking end 721 and the locking hole 62 would reduce the rotation of the locking member 72 around its axis, such that the engagement between the locking member 72 and the armrest 60 is more reliable.

The pushing member 74 of the armrest folding mechanism 70 includes pushing end 741 and a second rack part 742 which are provided at opposite ends of the pushing member 74, respectively. The second rack part 742 may take various forms, for example, it may be in a form of a rack. In the embodiment shown in the drawings, the second rack part 742 is in a form of a frame. Although the second rack part in a form of a frame is shown as having rectangular-shaped frame in this embodiment, the second rack part can take other shapes for the frame. In addition, as shown in FIG. 6, the frame of the second rack part 742 has an upper edge and a lower edge arranged parallel to each other, and the second toothed structure 7421 is arranged on the upper edge of the frame. Of course, the second toothed structure 7421 may also be provided on the upper edge and the lower edge of the frame at the same time; or alternatively, the second toothed structure 7421 may be only arranged on the lower edge of the frame. Correspondingly, teeth of the first toothed structure 7231 or the second toothed structure 7421 may be trapezoidal, triangular or circular.

The driving gear 78 is respectively connected to the locking member 72 and the pushing member 74, and pushing the locking member 72 and the pushing member 74 to move in opposite directions. For example, as seen in FIG. 6, the driving gear 78 pushes the locking member 72 and the pushing member 74 respectively to move rightward and leftward. The driving gear 78 is penetratingly arranged in the frame structure of the first rack part 723 and the frame structure of the second rack part 742, thereby engaging the first toothed structure 7231 and the second toothed structure 7421 simultaneously. Therefore, if the first toothed structure 7231 is arranged on the upper edge of the frame structure of first rack part 723, the second toothed structure 7421 is arranged correspondingly on the lower edge of the frame structure of the second rack part 742; and if the first toothed structure 7231 is arranged on the lower edge of the frame structure of the first rack part 723, the second toothed structure 7421 is arranged correspondingly on the upper edge of the frame structure of the second rack part 742.

A shaft 781 of the driving gear 78 is fixed in the housing 71 of the armrest folding mechanism 70, and locking member 72 and the pushing member 74 are positioned by the driving gear 78 penetratingly arranged therein. A locking end 721 of the locking member 72 is releasably fitted to the armrest 60. The armrest 60 has a locking hole 62, and the locking end 721 is releasably fitted to the locking hole 62. In an embodiment, when the backrest support 20 in the unfolded state, at least a part of the locking end 721 is located in the locking hole 62. The connecting end 722 of the locking member 72 abuts against the connecting seat 40 through an elastic component 76.

Figure 7:
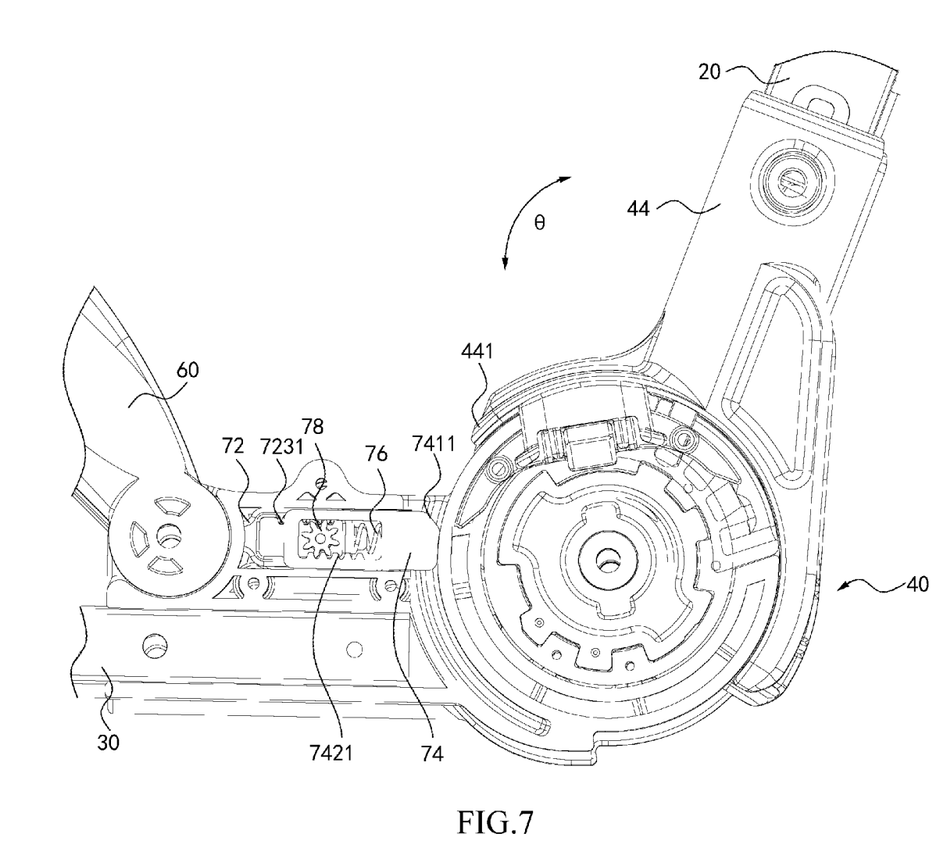
FIG. 7 is a schematic view showing an armrest folding mechanism according to the disclosure with the armrest folding mechanism in an unfolded state.
Figure 8:
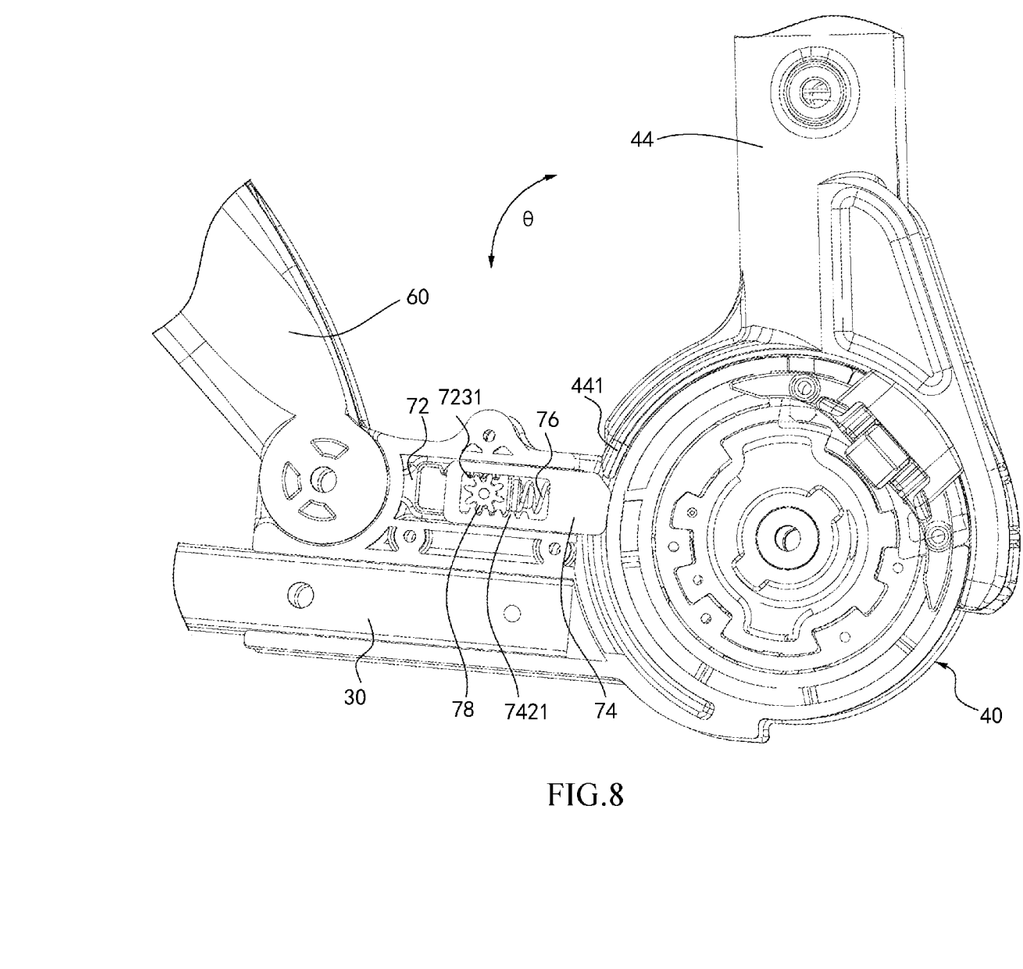
FIG. 8 is a schematic view showing an armrest folding mechanism according to the disclosure, in which the armrest folding mechanism begins to enter the folded state.

An action process of the armrest folding mechanism 70 according to the disclosure will be described as below with reference to FIGS. 7 and 8, in which FIG. 7 schematically shows a schematic view of the armrest folding mechanism 70 according to the disclosure with the armrest folding mechanism in an unfolded state, and FIG. 8 is a schematic view showing an armrest folding mechanism according to the disclosure, in which the armrest folding mechanism begins to enter the folded state. As described above, the connecting seat 40 includes the first connecting rod 42 and the second connecting rod 44 pivotally connected to each other. The first connecting rod 42 is fixed to the seat support 30, and the second connecting rod 44 is fixed to the backrest support 20, such that the backrest support 20 is pivotally rotatable relative to the seat support 30. The second connecting rod 44 of the connecting seat 40 is further provided with a driving member 441. When the backrest support 20 is pivotally folded in respect to the seat support 30, i.e., as an included angle θ between the backrest support 20 and the seat support 30 gradually decreases, the driving member 441 starts to contact and push the pushing member 74. Preferably, the pushing end 741 of the pushing member 74 is provided with a guiding face 7411. The guiding face 7411 is, for example, an inclined surface, so as to increase the contact area between the driving member 441 and the pushing end 741, such that the driving member 441 may push the pushing member 74 more easily. The pushing member 74 starts to move toward a side of the armrest 60 under an action of the driving member 441. Since the driving gear 78 is simultaneously engaged with the first toothed structure 7231 and the second toothed structure 7421, with the movement of the pushing member 74, the driving gear 78 starts to rotate by pushing action of the second toothed structure 7421. Moreover, the rotating driving gear 78 pushes the locking member 72 to start to move toward the side of the backrest support 20 by pushing action of the first toothed structure 7231. As shown in FIG. 6, the locking end 721 of the locking member 72 is gradually separated from the locking hole 62 of the armrest 60 to unlock the armrest 60, such that the armrest 60 may be folded toward the backrest support 20.

In the above-mentioned folding process of the armrest 60 toward the backrest support 20, the locking member 72 moves toward a side of the backrest support 20 and presses the elastic element 76, so that the elastic element 76 is in a compressed state. Therefore, on the other hand, when the backrest support 20 is in the unfolded state in respect to the seat support 30 again, an elastic force of the elastic element 76 may urge the locking member 72 to move toward a side of the armrest 60, and fit into the locking hole 62 of the armrest 60 again, and the armrest 60 is in a locked state again.

Figure 9:
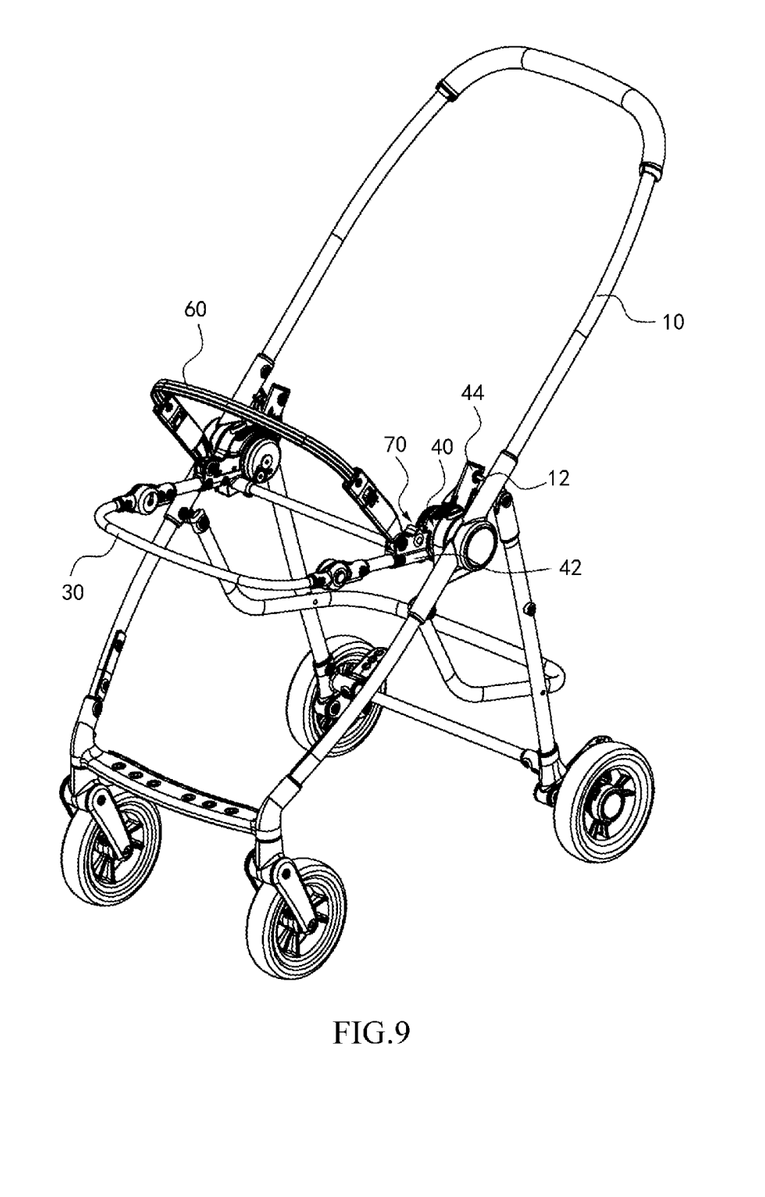
FIG. 9 is a schematic view of a baby carriage having an armrest folding mechanism according to another embodiment of the disclosure.

In the above embodiment, the second connecting rod 44 of the connecting seat 40 is connected to the backrest support 20 of the baby carriage. While in the baby carriage having an armrest folding mechanism according to another embodiment shown in FIG. 9, no backrest support 20 is arranged, so that the baby carriage can be lighter and the cost can be reduced. In the embodiment shown in FIG. 9, the second connecting rod 44 of the connecting seat 40 and the frame 10 are connected to each other by a crossbar 12. For example, the crossbar 12, the second connecting rod 44, and the frame 10 are all fixedly connected. When the frame 10 is folded in respect to the seat support 30, the second connecting rod 44 is linked with the frame 10, and the driving member 441 drives the armrest folding mechanism 70, such that the armrest 60 may also be folded accordingly by an action of the armrest folding mechanism 70. Of course, the second connecting rod 44 of the connecting seat 40 and the frame 10 may be directly connected to each other without the crossbar 12. The specific structure of the armrest folding mechanism 70 and its folded state and its unfold and locked state are the same as those in the foregoing embodiment, and will not be redundantly repeated here.

The armrest folding mechanism 70 according to the disclosure allows the armrest 60 to be folded with the retraction of the backrest support 20 or the frame 10 in respect to the seat support 30, and locks the armrest 60 again when the backrest support 20 or the frame 10 unfolds in respect to the seat support 30. Therefore, the convenience of the retraction operation is greatly improved. In addition, the armrest folding mechanism 70 according to the disclosure utilizes a gear transmission to achieve unlocking, and thus has the advantages of simple in structure, easy in assembling, and labor-saving in collapsible folding.

The description provided herein illustrates the various features by preferred and exemplary embodiments. Those ordinary skilled in the art can make many other embodiments, modifications and variations within the scope and spirit of the appended claims by reading this specification.

REFERENCE NUMERAL LIST

| | |
|---|---|
| 10: Frame | |
| 12: Crossbar | |
| 20: Backrest Support | |
| 30: Seat Support | |
| 40: Connecting seat | |
| 42: First Connecting Rod | 44: Second Connecting Rod |
| 441: Driving Member | |
| 60: Armrest | |
| 62: Locking Hole | |
| 70: Armrest Folding Mechanism | |
| 71: Housing | |
| 72: Locking Member | |
| 721: Locking End | 722: Connecting End |
| 723: First Rack Part | 7231: First Toothed Structure |
| 74: Pushing Member | |
| 741: Pushing End | 7411: Guiding Face |
| 742: Second Rack Part | 7421: Second Toothed Structure |
| 76: Elastic Element | |
| 761: First End | 762: Second End |
| 78: Driving Gear | |
| 781: Shaft | |

What is claimed is:

1. An armrest folding mechanism, pivotally connected to an armrest, and connected to a first connecting rod of a connecting seat, for folding the armrest with retraction of a second connecting rod of the connecting seat relative to the first connecting rod, comprising:
   a locking member, comprising a locking end and a connecting end as well as a first rack part between the locking end and the connecting end, the locking end being releasably fitted to the armrest, and a first toothed structure being arranged on the first rack part;
   a pushing member, comprising a pushing end and a second rack part, a second toothed structure being arranged on the second rack part, the pushing end being moved under a pushing action of the second connecting rod;
   an elastic element, comprising a first end and second end opposite to each other, the first end being connected to the connecting end, and the second end abutting against the connecting seat; and
   a driving gear, engaging with the first toothed structure and the second toothed structure.

2. The armrest folding mechanism according to claim 1, wherein the first rack part is formed as a first frame, the first frame has an upper edge and a lower edge arranged parallel to each other, and the first toothed structure is arranged on an inner side of at least one of the upper edge and the lower edge of the first frame;
   the second rack part is formed as a second frame, the second frame has an upper edge and a lower edge arranged parallel to each other, and the second toothed structure is arranged on an inner side of at least one of the upper edge and the lower edge of the second frame; and the driving gear is penetratingly arranged in the first frame and the second frame, to be engaged with the first toothed structure and the second toothed structure.

3. The armrest folding mechanism according to claim 2, wherein the first toothed structure is arranged on the inner side of the upper edge of the first frame, the second toothed structure is arranged on the inner side of the lower edge of the second frame; or alternatively
the first toothed structure is arranged on the inner side of the lower edge of the first frame, and the second toothed structure is arranged on the inner side of the upper edge of the second frame.

4. The armrest folding mechanism according to claim 2, wherein the first frame and/or the second frame is rectangular.

5. The armrest folding mechanism according to claim 1, wherein the second connecting rod of the connecting seat is provided with a driving member, and the driving member pushes the pushing end during a process the second connecting rod is folded in respect to the first connecting rod.

6. The armrest folding mechanism according to claim 5, wherein the pushing end is provided with a guiding face for guiding the pushing of the driving member.

7. The armrest folding mechanism according to claim 1, wherein the armrest is provided with a locking hole, and the locking end is releasably fitted into the locking hole.

8. The armrest folding mechanism according to claim 7, wherein the locking end of the locking member has a non-circular cross-section, and the locking hole of the armrest has a cross-section shaped matching that of the locking end.

9. A baby carriage comprising:
a frame, forming a main frame structure of the baby carriage;
two connecting seats, each of the connecting seats including a first connecting rod and a second connecting rod pivotally connected to each other, such that the second connecting rod folds and unfolds relative to the first connecting rod;
a seat support, both ends of the seat support being respectively connected to the first connecting rod of each of the connecting seats;
an armrest folding mechanism connected to the first connecting rod, the armrest folding mechanism comprising a locking member and a pushing member; and
an armrest pivotally connected to the armrest folding mechanism, such that the armrest is folded upon retraction of the second connecting rod of each of the connecting seats relative to the first connecting rod, wherein the locking member and the pushing member translate parallel to each other during retraction of the second connecting rod.

10. The baby carriage according to claim 9, wherein:
the locking member comprises a locking end and a connecting end as well as a first rack part between the locking end and the connecting end, the locking end being releasably fitted to the armrest, and a first toothed structure being arranged on the first rack part;

the pushing member comprises a pushing end and a second rack part, a second toothed structure being arranged on the second rack part, the pushing end being moved under a pushing action of the second connecting rod; and
the armrest folding mechanism further comprises:
an elastic element comprising a first end and second end opposite to each other, the first end being connected to the connecting end, and the second end abutting against the connecting seat; and
a driving gear engaging with the first toothed structure and the second toothed structure.

11. The baby carriage according to claim 9, wherein the second connecting rod is connected to the frame of the baby carriage.

12. The baby carriage according to claim 9, wherein the second connecting rod is connected to the frame of the baby carriage through a crossbar.

13. The baby carriage according to claim 9, wherein the baby carriage further comprises a backrest support pivotally connected to the seat support, and the second connecting rod is connected to the backrest support.

14. A baby carriage comprising:
a frame, forming a main frame structure of the baby carriage;
two connecting seats, each of the connecting seats including a first connecting rod and a second connecting rod pivotally connected to each other, such that the second connecting rod folds and unfolds relative to the first connecting rod;
a seat support, both ends of the seat support being respectively connected to the first connecting rod of each of the connecting seats;
an armrest folding mechanism connected to the first connecting rod, the armrest folding mechanism comprising:
a locking member, comprising a locking end and a connecting end as well as a first rack part between the locking end and the connecting end, the locking end being releasably fitted to the armrest, and a first toothed structure being arranged on the first rack part;
a pushing member, comprising a pushing end and a second rack part, a second toothed structure being arranged on the second rack part, the pushing end being moved under a pushing action of the second connecting rod;
an elastic element, comprising a first end and second end opposite to each other, the first end being connected to the connecting end, and the second end abutting against the connecting seat; and
a driving gear, engaging with the first toothed structure and the second toothed structure; and
an armrest pivotally connected to the armrest folding mechanism, such that the armrest is folded upon retraction of the second connecting rod of each of the connecting seats relative to the first connecting rod.

* * * * *